United States Patent
Goto et al.

(10) Patent No.: US 7,207,933 B2
(45) Date of Patent: Apr. 24, 2007

(54) CARBURIZED ROLLER MEMBER MADE OF HIGH CARBON CHROMIUM STEEL

(75) Inventors: Masao Goto, Osaka (JP); Katsuhiko Kizawa, Osaka (JP)

(73) Assignee: Koyo Seiko Co., Ltd., Osaka-shi, Osaka (JP)

(*) Notice: Subject to any disclaimer, the term of this patent is extended or adjusted under 35 U.S.C. 154(b) by 251 days.

(21) Appl. No.: 10/628,305

(22) Filed: Jul. 29, 2003

(65) Prior Publication Data
US 2004/0132598 A1  Jul. 8, 2004

(30) Foreign Application Priority Data
Jul. 30, 2002 (JP) ............... P.2002-221106

(51) Int. Cl.
*F16C 13/00* (2006.01)
(52) U.S. Cl. ............... 492/58; 492/59; 148/225; 148/233; 148/906
(58) Field of Classification Search ........... 492/58, 492/59; 148/906, 233, 225
See application file for complete search history.

(56) References Cited

U.S. PATENT DOCUMENTS

| | | | |
|---|---|---|---|
| 4,871,268 A * | 10/1989 | Furumura et al. | 384/492 |
| 4,904,094 A | 2/1990 | Furumura et al. | 384/492 |
| 5,122,000 A | 6/1992 | Matsumoto et al. | 384/492 |
| 6,251,197 B1 * | 6/2001 | Toda | 148/319 |
| 6,537,390 B1 * | 3/2003 | Goto | 148/319 |
| 2005/0092396 A1 * | 5/2005 | Takemura et al. | 148/318 |

FOREIGN PATENT DOCUMENTS

| | | |
|---|---|---|
| EP | 0 458 646 A1 | 11/1991 |
| EP | 1 099 869 A2 | 5/2001 |
| EP | 1 138 795 A1 | 10/2001 |
| JP | 62-24025 | 2/1987 |
| JP | 4-9449 | 1/1992 |
| JP | 4-103715 | 4/1992 |
| JP | 2000-345299 | 12/2000 |

OTHER PUBLICATIONS

Chinese Office Action dated Oct. 20, 2006 with English translation.

* cited by examiner

*Primary Examiner*—David P. Bryant
*Assistant Examiner*—Sarang Afzali
(74) *Attorney, Agent, or Firm*—McGinn IP Law Group, PLLC

(57) ABSTRACT

A roller member comprising high carbon chromium bearing steel having a carburization treatment. The bearing steel comprising a surface portion defined as a range between a surface of a rolling face of the roller member to a depth where a maximum shearing stress acts thereon, the surface portion containing carbon in a total amount comprising a range of 1.0 to 1.6 wt % and an amount of residual austenite comprising a range of 20 vol % to 35 vol % wherein a compression residual stress of the surface portion comprises a range of 150 to 1000 MPa, wherein a surface hardness of the surface portion comprises a range of 64 or higher in Rockwell C hardness, wherein an amount of carbide precipitate on the surface portion comprises a range of 10% to 25% in an area rate and each carbide particle size comprises a range of 3 μm or less.

2 Claims, 1 Drawing Sheet

CARBURIZED ROLLER MEMBER MADE OF HIGH CARBON CHROMIUM STEEL

BACKGROUND OF THE INVENTION

1. Field of the Invention

The present invention relates to a roller member and a method of producing the same, and in particular a roller member such as a roller cam follower use to a cam apparatus for turning a locker arm in a valve system of, for example, a car engine and a method of producing the same.

2. Field of the Invention

For instance, in the cam apparatus for turning the locker arm in the valve system of the car engine, a lubricating oil is insufficiently supplied to a contact between the cam and the roller cam follower, so that lubricating conditions are severe, and besides since the roller cam follower performs to the cam not a purely rolling contact but a rolling contact bringing with slide, the roller cam follower is ready for causing peeling in an outer circumference as a rolling face in a short period of time, resulting to shorten a service life.

Then, an assignee of this invention proposed, aiming at lengthening a life, a roller cam follower (Patent Laid Open No. 7-54616) comprising a blister steel (case hardened steel), performed with a carburization treatment, having a surface hardness of 63 to 68 in Rockwell C hardness (called as "HRC" hereafter), and containing surface residual austenite of 13 to 30 vol %. A reason for determining the surface hardness to be HRC 63 to 68, is because to avoid damages becoming a peel starting point when biting foreign materials or worsening the lubricating conditions as well as to secure toughness. Further, a reason for determining the surface residual austenite to be 13 to 30 vol % is because to prevent toughness from lowering to avoid cracking progressing, and check dimensional changes owing to martensite deformation when heating.

However, the above mentioned existing roller cam follower scarcely has carbides on the surface, and abrasion resistance is not satisfactory. As a raw material, the case hardened steel is employed. Since the case hardened steel is not mass-produced, a material cost is high, and as a result of heat treating costs for the carburization treatment or a carbonitriding treatment of the case hardened steel are expensive, a problem is to heighten total production cost of the roller cam follower.

It is therefore considered to carry out the carburization treatment or the carbonitriding treatment on a worked blank of the roller member formed into a predetermined shape from the bearing steel (high carbon chromium bearing steels) such as JIS SUJ2 for producing the roller cam follower, but in this case, it is not possible to concurrently increase surface hardness and refine carbides, and for example, if the carburization treatment is carried out on JIS SUJ2 inherently containing high carbon and carbide in order to increase the surface hardness, the already existing carbide more grows to be gigantic, and after all the service life is shortened.

Accordingly, it is an object of the invention to offer a roller member having a longer life than that of the conventional one and a method thereof.

SUMMARY OF THE INVENTION

The roller member according to a first aspect of the invention is characterized by comprising a bearing steel, being performed with a carburization treatment, containing carbon in total amount being 1.0 to 1.6 wt % in a surface portion of a range from a surface of a rolling face until a depth where a maximum shearing stress acts on, the amount of solute carbon being 0.6 to 1.0 wt % in a matrix of said surface portion, and said surface portion being precipitated with carbides of 5 to 20% in an area rate and of particle size being 3µ or less.

In the first aspect of the invention, reasons for limiting the respective numerical values are as follows.

All Amount of Carbon in the Surface Portion

All the amount of carbon is limited to be 1.0 to 1.6 wt %, because if exceeding the upper limit, carbides are considerably large and cannot be refined. The lower limit is necessarily determined on the basis of the bearing steel (high carbon chromium bearing steels) such as JIS SUJ2.

The Amount of Solute Carbon in the Matrix of the Surface Portion

The amount of solute carbon is limited to be 0.6 to 1.0 wt %, because if being less than the lower limit, a desired surface hardness cannot be provided, and if biting foreign materials on the roller member, for example, on the rolling face of the roller cam follower, or causing damages to become a peel starting point when worsening the lubricating conditions, peeling occurs in a short period of time, and if exceeding the upper limit, the amount of fine carbide in the surface portion is less than 5% in the area rate, so that the abrasion resistance goes down.

The Amount of the Carbide in the Surface Portion

The amount of the carbide is limited to be 5 to 20% in the area rate, because if being less than the lower limit, the abrasion resistance reduces, while if exceeding the upper limit, coarse carbide occurs and starts a fatigue crack, resulting in shortening the service life of the roller member.

The Particle Size of the Carbide in the Surface Portion

The reason for limiting the particle size to be 3 µm or less is because if exceeding 3 µm, it starts fatigue cracks similarly to non-metallic inclusions, and toughness cannot be secured.

If the amount of the carbide in the surface portion and the particle size are as mentioned above, the carbide is uniformly dispersed in the surface portion, and stability of the residual austenite increases, so that the roller member is prevented from dimensional changes.

According to the first aspect of the invention, since the surface hardness increases, it is possible to prevent damages becoming the peel starting point when biting foreign materials or worsening the lubricating conditions, and to avoid the peeling occurring in the short period of time, and in addition, the abrasion resistance is avoided from going down and the toughness is secured, and consequently, the long service life of the roller member can be attained. Further, the roller member is composed of the bearing steel mass-produced as bearings, and so the material cost is cheap, as a result, the production cost is low in total. Of the bearing steels, since JIS SUJ2 is particularly mass-produced, desirably the material cost is much reduced.

In the first aspect of the invention, the carburization treating temperature is preferably 840 to 870° C. In this case, the temperature is lower than heating temperatures of the carburization treatment or carbonitriding treatment, so that the heat treating cost is low. Accordingly, the production cost is low in total.

The roller member according to a second aspect of the invention is characterized by comprising a bearing steel, being performed with a carburization treatment, containing carbon in total amount of 1.0 to 1.6 wt % in a surface portion of a range from a surface of a rolling face until a depth where a maximum shearing stress acts on, an amount of residual austenite being 20 to 35 vol %, compression residual stress being 150 to 1000 MPa, surface hardness being rendered to be 64 or higher in Rockwell C hardness, and said surface portion being precipitated with carbides of 10 to 25% in an area rate and of particle size being 3µ or less.

In the second aspect of the invention, reasons for limiting the respective numerical values are as follows.

All Amount of Carbon in the Surface Portion

All the amount of carbon is limited to be 1.0 to 1.6 wt %, because if exceeding the upper limit, carbides are considerably large and cannot be refined. The lower limit is necessarily determined on the basis of the bearing steel such as JIS SUJ2.

The Amount of the Residual Austenite in the Surface Portion

The reason for limiting the residual austenite to be 20 to 35 vol % is because being within this range, the compressive stress occurring in the surface portion of the rolling face can be moderated, the crack can be avoided from further progress, the toughness increases, and the service life of the roller member can be more lengthened. However, if the amount of the residual austenite is less than 20 vol %, these effects cannot be provided, and if exceeding 35 vol %, the surface hardness in the surface portion does not exceed 64 HRC.

The Compression Residual Stress in the Surface Portion

The reason for limiting the compression residual stress to be 150 to 1000 MPa is because being within this range, the crack can be avoided from progressing, and as a result, the service life of the roller member can be more lengthened. However, if the amount of the compression residual stress is less than 150 MPa, these effects cannot be provided, and if exceeding 1000 MPa, changes as time-passing owing to extraordinary compression residual stress are problems.

The Surface Hardness in the Surface Portion

The reason for limiting surface hardness in the surface portion to be HRC 64 or more is because of in this case enabling to avoid occurrence of the peeling in the rolling face in the short period of time. The upper limit of the surface hardness is desirably around 69 for securing the toughness of the material, The Amount of the Carbide in the Surface Portion The reason for limiting the lower limit of the carbide to be 10% in the area rate is because if the amount of the carbide is less than 10% in the area rate, the amount of carbides in micron order and submicron order is short, and the effect of lengthening the service life might be unsatisfactory. Herein, the carbide in the micron order has an effect of preventing formation of a sliding zone causing fatigue, while the carbide in the submicron order does not have the effect of preventing formation of the sliding zone, but has the effect of dispersing it. Further, the reason for limiting the upper limit of the carbide to be 25% in the area rate is because exceeding 25%, the particle size of the carbide is inevitably large, and spaces between the respective carbides is small, and the carbide does not uniformly disperse.

The Particle Size of the Carbide in the Surface Portion

The reason for limiting the particle size to be 3 µm or less is the same as mentioned in the first aspect of the invention.

In case the amount and the particle size of the carbide in the surface portion are as mentioned above, the carbide uniformly disperses in the surface portion, the stability of the residual austenite increases, and the dimension of the roller member can be prevented from changing.

According to the second aspect of the invention, since the surface hardness increases, it is possible to avoid the damage starting the peel when biting foreign materials or worsening the lubricating conditions, so that occurrence of the peeling in the short period is prevented, and the abrasion resistance is prevented from decreasing and the toughness is secured. As a result, the life of the roller member is lengthened. Further, the roller member is composed of the bearing steel mass-produced as bearings, and so the material cost is cheap, as a result, the production cost is low in total. Of the bearing steels, since JIS SUJ2 is particularly mass-produced, desirably the material cost is much reduced.

In the first aspect of the invention, the carburization treating temperature is preferably 840 to 870° C. In this case, the temperature is lower than heating temperatures of the carburization treatment or carbonitriding treatment, so that the heat treating cost is low. Accordingly, the production cost is low in total.

The method of producing the roller member according to the third aspect of the invention is characterized by comprising heating an already processed a worked blank of roller member formed in a predetermined shape from a bearing steel in a carburizing atmosphere of carbon potential being 1.2% or more at 840 to 870° C. for 3 hours or longer, thereby to carry out a carburization treatment, followed by quenching, whereby all amount of carbon are rendered to be 1.0 to 1.6 wt % in a surface portion of a range from a surface of a rolling face until a depth where a maximum shearing stress acts on, an amount of solute carbon is rendered to be 0.6 to 10 wt % in a matrix of said surface portion, and said surface portion is precipitated with carbides of 5 to 15% in an area rate and of particle size being 3µ or less.

In the third aspect of the invention, the reason for limiting the numerical values in the carburization treatment is as follows. In regard to the lower limits of the amount of all carbon in the surface portion, the amount of solute carbon in the matrix of the surface portion, and the amount and the particle size of the carbide in the surface portion, the limiting reasons are the same as explained in the first aspect of the invention.

The Upper Limit of the Amount of the Carbide in the Surface Portion

For exceeding the amount of the carbide 15% in the area rate, the carburization treating time should be long, as a result, the heat treating cost is high in comparison with the case of the area rate being 15% or lower.

The Carbon Potential in the Carburization Treating Atmosphere

The reason for limiting the carbon potential to be 1.2% or more is because being less than 1.2 wt %, the carburization is scarcely effected to the bearing steel containing carbon around 1 wt %, and a desired hardness of the surface portion and a desired area rate cannot be obtained, and further carbide cannot be refined.

The Carburization Treating Temperature

The reason for limiting the temperature to be 840 to 870° C. is because being less than the lower limit, the desired carburization cannot be carried out as mentioned as to the carbon potential, while exceeding the upper limit, a crystal grain size of the surface portion is too large, and gigantic carbides are precipitated to lower the strength. That is, since tensile strength is in proportion to −½ power of the crystal grain size, if the crystal grain size is too large, the strength goes down.

The Carburization Treating Time

The reason for limiting the time to be 3 hours or longer is because being shorter than 3 hours, the decarburizing depth is insufficient.

According to the third aspect of the intention, since employed is the blank composed of the bearing steel much used as the bearings, the material cost is cheap. Besides, the carburization treating temperature is 840 to 870° C., and the heating treatment is sufficient with quenching after the once carburization treatment, so that the heating treating cost is cheap, and accordingly, the production cost of the roller member is low in total. Of the bearing steels, since JIS SUJ2 is particularly mass-produced, desirably the material cost is much reduced.

In the third aspect of the invention, the carbon potential is preferably 1.2 to 1.4%. Exceeding 1.4%, there arises a problem of generating much soot.

Further, in the third aspect of the invention, the heating time is preferably 3.5 to 5 hours. Exceeding 5 hours, the heat treating cost is high, and there arises a problem that carbide is gigantic.

The method of producing the roller member according to the fourth aspect of the invention is characterized by comprising heating an already processed a worked blank of the roller member formed in a predetermined shape from a bearing steel in a carburizing atmosphere of carbon potential being 0.9 to 1.1% at 930 to 970° C. for 1 hour or longer, thereby to carry out a treatment for fusing the already existing carbides into the matrix, followed by quenching, and subsequently heating in the atmosphere of the carbon potential of 1.2% or more at 840 to 870° C. for 3 hours or longer so as to carry out the carburization treatment, followed by quenching, whereby all amount of carbon are rendered to be 1.0 to 1.6 wt % in a surface portion of a range from a surface of a rolling face until a depth where a maximum shearing stress acts on, an amount of solute carbon is rendered to be 0.6 to 1.0 wt % in a matrix of said surface portion, and said surface portion is precipitated with carbides of 10 to 20% in an area rate and of particle size being 2µ or less.

In the fourth aspect of the invention, the reason for limiting the numerical values in the heating treatment is as follows. In regard to the upper limits of the amount of all carbon in the surface portion, the amount of solute carbon in the matrix of the surface portion, and the amount of the carbide in the surface portion, the limiting reasons are the same as explained in the first aspect of the invention.

The Lower Limit of the Amount of the Carbide in the Surface Portion

The reason for limiting the lower limit of the carbide to be 10% in the area rate is because if being less than 10%, the amount of carbides in micron order and submicron order is short, and the effect of lengthening the sliding life is not probably provided. Herein, the carbide in the micron order has an effect of preventing formation of the sliding zone causing fatigue, while the carbide in the submicron order does not have the effect of preventing formation of the sliding zone but has the effect of dispersing it.

The Particle Size of the Carbide in the Surface Portion

The reason for limiting the particle size of the carbide to be 2 µm or less is because if exceeding 2 µm, it starts fatigue cracks similarly to non-metallic inclusions, and the toughness might be insufficient.

Process of Fusing Already Existing Carbide into the Matrix

The reason for limiting the carbon potential 0.9 to 1.1% in the atmosphere in this process is because not to cause carburization nor decarburization in the roller member. Exceeding 1.1%, the carburization is caused in the bearing steel containing around 1 wt %, while being less than 0.9%, the decarburization is caused.

The reason for limiting the heating temperature to be 930 to 970° C. in this process is because being less than 930° C., the carbide is insufficiently made solid in the matrix as a second phase existing after sintering the globular carbide, while exceeding 970° C., quenching crack possibly occurs.

Further, the reason for limiting the heating time to be 1 hour or longer in this process is because being less than shorter than 1 hour, the carbide is insufficiently made solid in the matrix as the second phase existing after sintering the globular carbide.

Carburization Process

The reason for limiting the carbon potential to be 1.2% or more in the atmosphere in this process is because being less than 1.2 wt %, the carburization is scarcely effected to the bearing steel containing carbon around 1 wt %, and a desired hardness of the surface portion and a desired area rate cannot be obtained, and carbide cannot be refined. The upper limit of the carbon potential is preferably 1.4% for avoiding much occurrence of soot.

The reason for limiting the heating temperature to be 840 to 870° C. in this process is because being less than the lower limit, the desired carburization cannot be carried out as mentioned as to the carbon potential, while exceeding the upper limit, the crystal grain size of the surface portion is too large, and gigantic carbides are precipitated to lower the strength. That is, since tensile strength is in proportion to −½ power of the crystal grain size, if the crystal grain size is too large, the strength goes down.

The reason for limiting the heating time to be 3 hours or longer in this process is because being shorter than 3 hours, the necessary decarburizing depth is not provided.

According to the fourth aspect of the invention, the treatment is carried out for fusing the already existing carbides into the matrix, and then the carburization treatment is performed, so that it is possible to again precipitate fine carbides from nuclei of the carbides solute in the matrix. Accordingly, it is possible to avoid occurrence of the fatigue crack, secure the toughness, and lengthen the service life of the roller member. Further, the roller member is composed of the bearing steel mass-produced as bearings, and so the material cost is cheap, and as a result, the production cost is low in total. Of the bearing steels, since JIS SUJ2 is particularly mass-produced, desirably the material cost is much reduced.

In the fourth aspect of the invention, the amount of the globular carbide in the surface portion after having performed the carburization treatment is desirably 13 to 16% in the area rate.

If the amount of the globular carbide is more than 13% in the area rate, the effect of preventing the formation of the sliding zone by the micron order as well as the effect of dispersing the formation of the sliding zone by the submicron order are more excellent, and the sliding life is heightened. Further, taking the cost into consideration, in a gas carburization, the amount of the globular carbide is reasonably 16% or less in the area rate.

In the first to fourth aspects of the invention, the range from the surface until the depth where the maximum shearing stress acts on, is changed depending on loads when rolling or the lubricating conditions, but is meant by a range from the surface to around 0.5 mm. A reason for determining this range as an above mentioned condition is as follows. That is, within the range where the maximum bearing steel acts on as causing an internal peel starting point, the amount of all carbon, the amount of solute carbon in the matrix, and the amount of the globular carbide are treated as mentioned above, thereby to increase the strength, and as a result, a predetermined object is accomplished.

DETAILED DESCRIPTION OF THE PREFERRED EMBODIMENTS

Following explanation will be made to specific examples of this invention together with comparative examples.

EXAMPLES 1 TO 4 AND COMPARATIVE EXAMPLE 1

Two kinds of steels shown in Table 1 were prepared, and five kinds of blanks of roller member were produced, modeling rollers of the roller cam follower in the valve system of a car engine.

TABLE 1

| Steel kinds | Composition (wt %) | | | | | | |
|---|---|---|---|---|---|---|---|
| | Fe | C | Si | Mn | Ni | Cr | Mo |
| A (SUJ2) | Balance | 1.01 | 0.24 | 0.36 | 0.04 | 1.46 | 0.01 |
| B (Case hardened steel) | Balance | 0.20 | 0.20 | 0.80 | 0.05 | 0.85 | 0.01 |

Subsequently, these blanks of roller member were carried out with the heating conditions shown in FIGS. 1 to 3 for producing the rollers for testing peeling (Examples 1 to 4 and Comparative Example 1).

Figure 1:
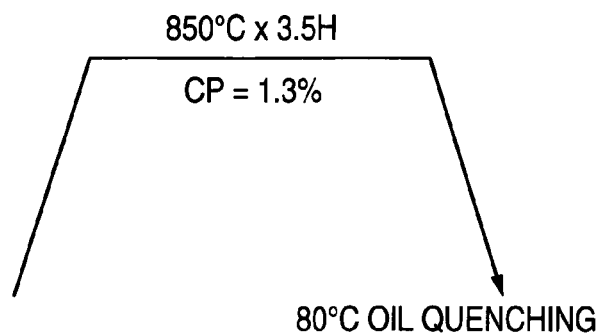
FIG. 1 is a diagram showing the heat treating condition 1.
Figure 2:
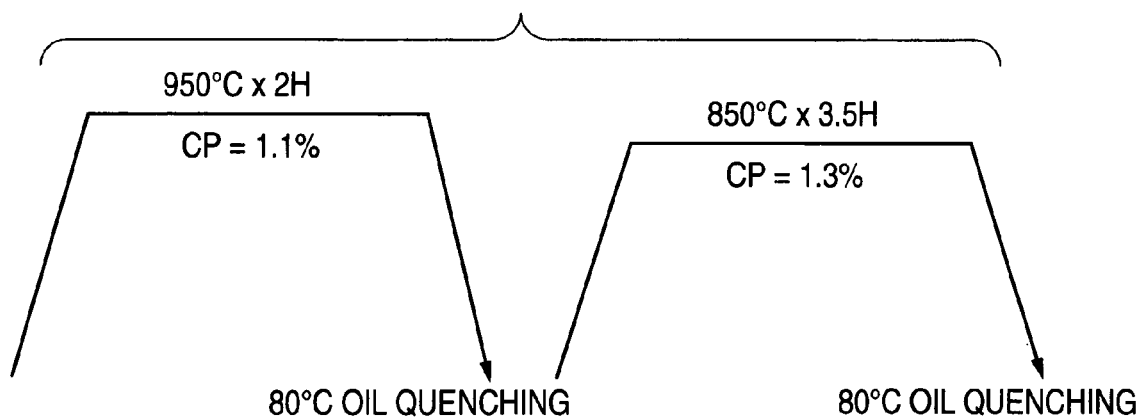
FIG. 2 is a diagram showing the heat treating condition 2.

The heat treating condition 1 shown in FIG. 1 comprises heating in the atmosphere of the 1.3% carbon potential at 850° C. for 3 hours, and then oil quenching to 80° C.

The heat treating condition 2 shown in FIG. 2 comprises heating in the atmosphere of the 1.1% carbon potential at 950° C. for 2 hours, and oil quenching to 80° C., and subsequently heating in the atmosphere of the 1.3% carbon potential at 850° C. for 3.5 hours, and then oil quenching to 80° C.

Figure 3:
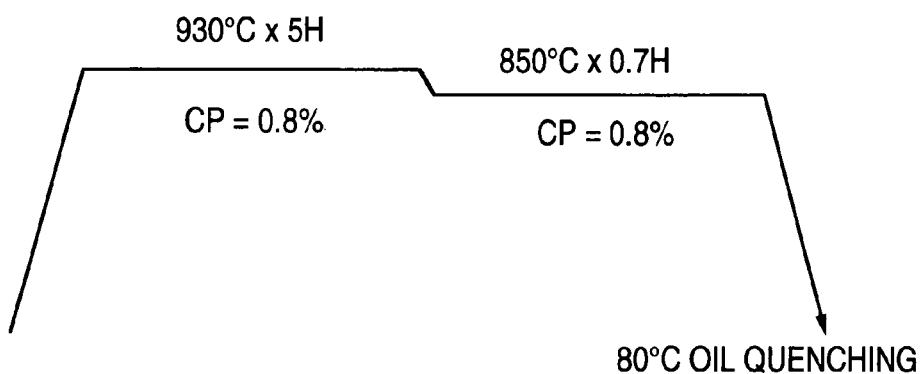
FIG. 3 a diagram showing the heat treating condition 3.

The heat treating condition 3 shown in FIG. 3 comprises heating in the atmosphere of the 0.8% carbon potential at 930° C. for 5 hours, and consecutively heating in the atmosphere of the 0.8% carbon potential at 850° C. for 0.7 hours, and then oil quenching to 80° C.

Although not showing drawings in the above three heating treatments, in each case, a tempering was finally performed at 160° C. for 2 hours.

Table 2 shows the steel kinds, the heat treating conditions and the heat treating costs of Examples 1 to 4 and Comparative Example 1 of the thus produced rollers. The heat treating condition 1A of Table 2 changed the only heating time of the heat treating condition 1 to 5 hours, and the heat treating condition 1B changed the only heating time of the heat treating condition 1 to 3.5 hours. The heat treating costs are shown as 1 to 3 in order of cheap ones.

TABLE 2

| | Steel kinds | Heat treating conditions | Heat treating costs |
|---|---|---|---|
| Example 1 | A | 1 | 1 |
| Example 2 | A | 1A | 1 |
| Example 3 | A | 1B | 1 |
| Example 4 | A | 2 | 2 |
| Comparative Example 1 | B | 3 | 3 |

Table 3 shows the surface hardness (HRC) of the rolling faces of the rollers for testing peelings of Examples 1 to 4 and Comparative Example 1, the amounts of all carbon in the uppermost surfaces of the rolling faces, the amounts of solute carbon in the matrix in the uppermost surfaces of the rolling faces, the amounts (area rates) of spherical carbide precipitated in the uppermost surfaces of the rolling faces, the maximum particle sizes of the spherical carbide precipitated in the uppermost surfaces of the rolling faces, the amounts of austenite ($\gamma R$ amount) at the position of the depth of 50 μm from the surfaces of the rolling faces, and the compression residual stress at the position of the depth of 50 μm from the surfaces of the rolling faces.

TABLE 3

| | Surface hardness (HRC) | Amount of total carbon (wt %) | Amount of solute carbon (wt %) | Area percent of carbide (%) |
|---|---|---|---|---|
| Example 1 | 65.2 | 1.32 | 0.80 | 9.6 |
| Example 2 | 65.0 | 1.58 | 0.83 | 14.0 |
| Example 3 | 64.8 | 1.40 | 0.81 | 11.0 |
| Example 4 | 65.0 | 1.45 | 0.81 | 15.5 |
| Com. Ex. 1 | 62.1 | 0.85 | 0.72 | 2.3 |

| | Maximum diameter (μm) | YR (vol %) | Compression residual stress (MPa) | Lives |
|---|---|---|---|---|
| Example 1 | 1.3 | 23 | 150 | 2.2 |
| Example 2 | 2.8 | 32 | 178 | 3 |
| Example 3 | 2.1 | 28 | 134 | 2.5 |
| Example 4 | 1.55 | 25 | 175 | 4 |
| Com. Ex. 1 | 0.3 | 25 | 200 | 1 |

Com. Ex.: Comparative Example

Evaluating Test

The rollers for testing peelings of Examples 1 to 4 and Comparative Example 1 were taken as cylinders to be driven and the rollers composed of JIS FCD700 (cast iron) and performed with the induction quenching treatment were taken as driving cylinders, and both were combined to set up a two cylinder testing apparatus. The drive cylinder of the two cylinder testing apparatus was rotated by a motor to rotate the cylinder to be driven contacting the outer circumference for testing the service life. During testing, the lubricating oil was supplied to the contacting part of both cylinders. The life was determined at a time when the rolling face of the testing roller was generated with the peeling damage and vibration became large. The results of testing the lives are also shown in Table 3. As to the life test results, in such a manner that Comparative Example 1 was made 1, and on the basis thereof, the life test results were shown.

As apparently from the above results, it is seen that Examples 1 to 4 of the inventive goods largely improve the lives in comparison with Comparative Example 1. Besides, since Examples 1 to 4 employ JIS SUJ2 most mass-produced among the bearing steels, comparing with Comparative Example employing the case hardened steel, the material costs are in particular lower. In addition, the heat treating costs are also cheap.

What is claimed is:

1. A roller member comprising: high carbon chromium bearing steel having a carburization treatment, said bearing steel comprising: a surface portion defined as a range between a surface of a rolling face of the roller member to a depth where a maximum shearing stress acts thereon, said surface portion containing carbon in a total amount comprising a range of 1.0 to 1.6 wt % and an amount of residual austenite comprising a range of 20 vol % to 35 vol %;

wherein a compression residual stress of said surface portion comprises a range of 150 to 1000 MPa.

wherein a surface hardness of said surface portion comprises a range of 64 or higher in Rockwell C hardness, wherein an amount of carbide precipitate an the surface portion comprises a range of 10% to 25% in an area rate and each carbide particle size comprises a range of 3 µm or less.

2. The roller member according to claim 1, wherein the high carbon chromium bearing steel comprises JIS SUJ2.

* * * * *